(12) United States Patent
Colaianna et al.

(10) Patent No.: US 7,037,991 B2
(45) Date of Patent: May 2, 2006

(54) TFE COPOLYMERS

(75) Inventors: Pasqua Colaianna, Milan (IT); Giulio Brinati, Milan (IT); Vincenzo Arcella, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/619,190

(22) Filed: Jul. 15, 2003

(65) Prior Publication Data
US 2004/0054107 A1 Mar. 18, 2004

(30) Foreign Application Priority Data
Jul. 16, 2002 (IT) .......................... MI2002A1561

(51) Int. Cl.
*C08F 214/26* (2006.01)

(52) U.S. Cl. .................. 526/247; 526/206; 526/291; 526/292.9

(58) Field of Classification Search ................ 526/247, 526/206, 291, 292.9
See application file for complete search history.

(56) References Cited

U.S. PATENT DOCUMENTS

| | | | | |
|---|---|---|---|---|
| 3,642,742 A | | 2/1972 | Carlson et al. ......... | 260/87.5 A |
| 4,864,006 A | * | 9/1989 | Giannetti et al. ........... | 526/209 |
| 5,071,609 A | * | 12/1991 | Tu et al. ...................... | 264/119 |
| 5,180,803 A | * | 1/1993 | Gibbard ....................... | 528/488 |
| 5,463,006 A | * | 10/1995 | Abusleme et al. .......... | 526/247 |
| 5,703,185 A | | 12/1997 | Blair .......................... | 526/247 |
| 5,760,151 A | | 6/1998 | Aten et al. .................. | 526/247 |
| 6,395,834 B1 | * | 5/2002 | Albano et al. .............. | 525/199 |
| 6,545,111 B1 | * | 4/2003 | Colaianna et al. .......... | 526/250 |

FOREIGN PATENT DOCUMENTS

| | | |
|---|---|---|
| EP | 0 184 459 | 6/1986 |
| EP | 0 247 379 | 12/1987 |
| EP | 0 633 274 | 1/1995 |
| EP | 0 818 489 | 1/1998 |
| EP | 0 979 832 | 2/2000 |
| EP | 1382620 A1 * | 1/2004 |

OTHER PUBLICATIONS

Pucciariello, Rachele, "Equilibrium Melting Temperature of Tetrafluoroethylene-Perfluoroalkylvinylether Copolymers", Journal of Applied Polymer Science, John Wiley & Sons, Inc., vol. 64, pp. 407-409 (1997).*

* cited by examiner

*Primary Examiner*—David W. Wu
*Assistant Examiner*—Henry S. Hu
(74) *Attorney, Agent, or Firm*—Arent Fox PLLC

(57) ABSTRACT

Copolymers formed by TFE and FMVE containing FMVE in percent by moles from 2.5% to 8%; the % TFE moles being the complement to 100% of the FMVE moles.

7 Claims, No Drawings

TFE COPOLYMERS

The present invention relates to polymers used for the preparation of LAN cables (Local Area Network) for communications.

More specifically the present invention relates to fluorinated polymers used for the LAN cables preparation having improved properties, in particular the extrusion rate combined with improved electric insulation properties.

It is known in the prior art that LAN cables are obtained by extrusion and consist of a metal cable covered with a polymer, included fluorinated polymers, acting as insulator (primary cable). The LAN builds can also be formed by a series of interlaced primary cables, covered by a sheath or external jacket, constituted by a polymer equal or different from the polymer used for the primary cable. The obtained primary cable must have specific mechanical and electric properties.

For this ground it is required that the polymers used for the application in LAN cables show the following property combination:
good chemical and thermal resistance;
good electric insulation properties (low dielectric constant and low dissipation factor);
good processability, as high extrusion speed with absence of melt-fracture and cracks of the extrusion cone;
maintenance on the finished cable of the following mechanical properties according to the UL 444 standard:
stress and elongation at break determined at 23° C. higher than or equal to, respectively, 17.2 MPa and 200%;
the stress and elongation at break after thermal aging at 232° C. for 7 days must maintain at least 75% of their initial value.

It is known in the prior art the use in said applications of TFE copolymers with HFP and perfluoroalkylvinylethers, in particular TFE/HFP/FPVE or TFE/HFP/FEVE wherein TFE=tetrafluoroethylene, HFP=hexafluoropropene, FPVE=perfluoropropylvinylether, FEVE=perfluoroethylvinylether.

In U.S. Pat. No. 5,703,185 a TFE/HFP/FEVE copolymer for application in cables is described, which allows to reach higher extrusion speeds with respect to the TFE/HFP/FPVE copolymer. However even when the copolymer containing FEVE is used, on the basis of the results reported in the Examples of U.S. Pat., it is observed that at an extrusion speed of 800–900 m/min, the number of defects at the spark test is high, and there are from 3 to 4 sparks on a length of 14 km of cable. To obtain a lower number of defects in the same test, for example only one defect for the same cable length, it is necessary to reduce the wire speed under 800 m/min, in particular 732 m/min. Therefore to maintain good cable insulation properties it is necessary to reduce the extrusion speed and consequently the cable productivity. Therefore the known fluorinated copolymers of the prior art do not allow to obtain an improved combination of extrusion speed with improved electric insulation properties.

In EP 633,274 FMVE (perfluoromethylvinylether), TFE and perfluoroalkylvinylether terpolymers, in particular FPVE, are described, also used for preparing cables. The Applicant has found that by using said terpolymers there is not the above combination of improved properties since the extrusion rates are lower than 800 m/min and the defect number at the spark test is high.

The need was felt to have available polymers to be used in the preparation of LAN cables, in particular for preparing wire coating sheaths, which had the following property combination:
good chemical and thermal resistance;
good electric insulation properties, in particular low dielectric constant and low dissipation factor;
good processability, as a combination of the following properties:
high extrusion rate, of the order of about 800, in particular of the order of 900 m/min, or higher;
absence of melt-fracture and cracks of the extrusion cone;
spark test: at most two defects on 14 km of cable at extrusion rate of 900 m/min;
maintenance on the finished cable of the mechanical properties according to the UL 444 standard.

The Applicant has surprisingly and unexpectedly found fluorinated TFE-based polymers to be used in the LAN cable preparation which solve said technical problem.

An object of the present invention are copolymers formed by TFE and FMVE, having the following composition:
FMVE in percent by moles from 2.5% to 8%, preferably from 3.7% to 5.2%;
the % TFE moles being the complement to 100% of the FMVE moles.

Preferably the invention copolymers have the following properties:
Melt Flow Index (ASTM D 1238) from 8 g/10 min to 50 g/10 min, preferably from 20 g/10 min to 40 g/10 min;
the second melting temperature T(II) melt from 250° C. to 300° C., preferably 275° C.–289° C.

The invention copolymers show the following improved property combination:
good chemical and thermal resistance;
improved electric insulation property (low dielectric constant and low dissipation factor, even at extrusion rate >800 m/min, and also >900 m/min;
improved processability, as high extrusion rate, higher than 800 m/minute, preferably of 900 m/min and even 1000 m/min, with absence of melt-fracture and cracks of the extrusion cone;
spark test: at most two defects on 14 km of cable at the speed of 900 m/min;
maintenance on the finished cable of mechanical properties according to the UL 444 standard.

The present invention fluoropolymers can be prepared by radical polymerization in aqueous or organic solvent. The emulsion polymerization in aqueous medium is carried out in the presence of a water-soluble inorganic radical initiator, such for example a peroxide, a percarbonate, a persulphate or azo compounds. Generally said radicals have sufficiently long half-life times, such that said compounds are present during the whole polymerization. In some cases a reducing agent can be added so to make easier the initiator decomposition. Said compounds can for example be iron salts. The initiator amount depends on the reaction temperature and on the reaction conditions. In particular said polymers are synthesized at a temperature in the range 60° C.–90° C. preferably 70° C.–80° C. Besides for the synthesis of said copolymers in particular a chain transfer agent is introduced so to regulate the polymer molecular weight, giving narrow molecular weight distributions. The used transfer agents can be ethane, methane, propane, chloroform, etc. The polymerization in aqueous phase takes place in the presence of fluorinated surfactants such for example perfluoroalkylcarboxylic acid salts (for example ammonium perfluorocaprylate, ammonium perfluorooctanoate), or other compounds such for example perfluoroalkoxybenzene-sulphonic acid salts, as described for example in EP 184,459. For the invention copolymer synthesis it is particularly advantageous to carry out the polymerization in aqueous phase in the presence of perfluoropolyethers, which can be added in the reaction medium under the form of aqueous emulsion in the presence of a suitable dispersing agent, as described in EP 247,379 or, preferably, in the form of aqueous microemulsion as described in U.S. Pat. No. 4,864,006.

Alternatively, the polymerization can be carried out in an organic solvent as described for example in U.S. Pat. No. 3,642,742. The polymerization initiator must be soluble in the reaction solvent. Said initiators can be alkylpercarbonates or perfluoroacylperoxides. The comonomers are generally fed to the reactor in the form of gaseous mixtures. The polymerization pressure is maintained constant by feeding the gaseous mixture TFE/fluoroalkylvinylether. The reaction pressures are in the range 15 Atm (1.5 MPa)–40 Atm (4 MPa), preferably in the range 20 Atm (2 MPa)–30 Atm (3 MPa).

The latex is coagulated and the recovered solid is dried and granulated. The granules are extruded in wire line to cover a metal conductor, for example copper. The extrusion temperature has a value generally at least 60° C. higher than that of the second melting temperature of the polymer.

The Applicant has found that the monomeric composition range is critical to obtain TFE/FMVE copolymers having the required properties. Indeed by increasing the TFE amount in the copolymer over the limits indicated in the present invention, the mechanical properties determined on the cable (stress and elongation at break) do not satisfy the minimum values required by the UL 444 standard. Furthermore in this case the reached wire speed is not sufficiently high and there is a greater number of spark failures with respect to the cables covered with the invention copolymers.

The Applicant has found that by using TFE/FMVE/FPVE terpolymers, wherein the FMVE amount is in the amounts of the present invention, lower wire speeds are obtained with respect to the copolymers of the present invention. See the comparative Examples.

Furthermore, when in the invention copolymers the FMVE amount is in the preferred range, said copolymers are particularly suitable to obtain LAN cables since they have a dissipation factor lower than that of the polymers at present used (TFE/HFP/FEVE), so to obtain at high frequencies an improved insulation.

The results of the present invention are still more surprising if it is considered that in the prior art it is reported that the TFE/perfluoroalkylvinylethers copolymers are not suitable to be used for the above purposes. For example, in U.S. Pat. No. SIRH130 it is stated that a TFE/FPVE copolymer has disadvantages when used in the wire covering since said copolymer is extrudable at high speeds only if the melt viscosity is lowered. In this way, according to the mentioned patent, there is the drawback to also decrease the stress crack resistance determined by the flex life. In U.S. Pat. No. SIRH130 it is also stated that when the stress crack resistance decreases, cracks on the cable insulation appear.

The Applicant has surprisingly and unexpectedly found that in the case of the TFE/FMVE copolymers of the present invention the good processability at high extrusion rates is maintained, even decreasing the melt viscosity.

Besides, the mechanical properties of the cable sheaths obtained with the copolymers of the present invention have been found to comply with the UL 444 standards.

The following Examples illustrate the invention without limiting the scope thereof.

EXAMPLES

The physical and mechanical properties of the copolymers illustrated in the Examples have been determined by the following methods:

Second Melting Temperature T(II) Melt

The temperature is determined by a differential scanning calorimeter (Perkin Elmer). Approximately 10 mg of specimen are heated from room temperature up to 350° C. with a 10° C./min rate. The specimen is maintained at 350° C. for 5 min and then cooled to room temperature with a 10° C./min rate. The specimen is heated again up to 350° C. with the same above modalities. During this phase the temperature corresponding to the maximum of the melting endothermal curve is recorded and indicated as second melting temperature.

Determination of the Melt Flow Index (MFI)

The determination is carried out according to the ASTM D 1238 standard.

Flex Life Determination

The Flex Life is determined according to the ASTM D 2176-63T standard

Determination of the Mechanical Properties on the Cable According to UL 444 Standard Various specimens of the manufactured cable are drawn and the mechanical properties of the insulating sheath are determined, before and after thermal aging for 7 days at 232° C. The mechanical properties are evaluated at the temperature of 23° C.

Example 1

Preparation of a TFE/FMVE 96/4 Polymer According to the Ivnention and Covering of a Conductor with a Sheath Formed by the Polymer 13.9 liters of demineralized water, 128 g of a microemulsion prepared according to U.S. Pat. No. 4,864,006 are introduced in sequence in a 22 liter AISI 316 steel vertical autoclave, equipped with stirrer working at 400 rpm, after vacuum has been made. Then it is heated until reaching the temperature of 75° C. At this temperature 0.535 bar ($5.35 \times 10^4$ Pa) of ethane and 3.16 absolute bar ($3.16 \times 10^5$ Pa) of FMVE are fed. Then a gaseous TFE/FMVE mixture in molar ratio of TFE/FMVE of 24 until reaching a pressure of 21 absolute bar ($2.1 \times 10^5$ Pa) is added by a compressor.

The composition of the gaseous mixture present in the autoclave head analyzed by gaschromatography. Before the reaction starts the gaseous phase results to be formed by the following compounds, in the indicated molar percentages: TFE 78.7%, FMVE 19.6%, ethane 1.7%. By a metering pump with a flow-rate of 170 ml/h, a KPS solution (potassium persulphate) 0.0103 M is fed. The polymerization pressure is maintained constant by feeding the aforesaid monomeric mixture and when 8,800 g of the above mixture have been fed, the monomer feeding is interrupted. The stirring is stopped and the pressure is let decrease until it reaches 6 absolute bar ($6 \times 10^5$ Pa). The reactor is cooled at room temperature, the emulsion is discharged and it is coagulated with nitric acid 65%. The polymer is washed with water and then dried at 220° C. The nominal polymeric composition (calculated on the basis of the fed monomers), is the following: FMVE 6.5% by weight (4% by moles), TFE 93.5% by weight (96% by moles).

Table 1 reports the composition and some chemico-physical properties of the polymer.

The TFE/FMVE copolymer is extruded on a AWG 24 copper cable having a diameter of 0.51 mm, using a wire covering line wherein an extrusion technique is used with pipe die. The die is formed by a die having a diameter of about 8 mm and a tip having a diameter of about 5 mm. The thickness of the insulating sheath covering the conductor is of 0.15 mm, thus obtaining a draw down ratio of about 110. The length of the melted polymer cone coming out from the extrusion head is of about 5 cm and the distance from the cooling tank is at least of 10 cm. The temperature profile set in the extruder is the following:

$T_1=250°$ C.
$T_2=320°$ C.
$T_3=355°$ C.
$T_4=375°$ C.
$T_5=390°$ C.
$T_{FLANGE}=390°$ C.
$T_{BODY}=400°$ C.
$T_{DIE\ HOLDER}=410°$ C.
$T_{DIE}=420°$ C.

The copper cable is preheated at a temperature from 90° C. to 110° C. By using said conditions the cable can be stretched at rising rates by setting the suitable rotation speeds of the extruder screw until reaching polymer flow instability (oscillations, cone cracks, etc.).

The cable quality is monitored in line by a spark tester by which it is measured, on the basis of an applied potential difference, how many spark failures occur during the cable manufacture. Said spark failures occur in correspondence of defects in the insulating sheath. As reference length for detecting the spark failure number, 14 km of produced cable have been considered.

The reached maximum speed and the spark failure number occurring for 14 km of manufactured cable are reported in Table 2.

The cable is wound on winding coils. Various specimens of the manufactured cable are drawn and the mechanical properties of the insulating sheath, before and after thermal aging for 7 days at 232° C., as required by the UL 444 standard, are determined.

The results are reported in Table 3.

Example 2 (Comparative)

Preparation of a Wire with Sheath Formed by a TFE/FMVE/FPVE Terpolymer

The TFE/FMVE/FPVE terpolymer has been used, having composition, expressed in percent by moles TFE 96.15% FMVE 3.5%, FPVE 0.35%, commercially known as Hyflon® MFA840, prepared according to U.S. Pat. No. 5,463,006.

Granules of the terpolymer are extruded to obtain a wire covered as described in Example 1.

The composition and some chemico-physical properties of the polymer are reported in Table 1.

The reached maximum rate and the spark failure number occurring for 14 km of manufactured cable are reported in Table 2; the mechanical properties of the insulating sheath before and after thermal aging for 7 days at 232° C. (UL 444 standard) are reported in Table 3.

Example 3

Preparation of a TFE/FMVE 96.3/3.7 Polymer and Subsequent Extrusion in Wire Line The polymerization described in Example 1 is repeated except for the amount of the following components:
ethane: 0.515 absolute bar ($5.15 \times 10^4$) Pa;
FMVE: 2.87 absolute bar ($2.87 \times 10^5$) Pa;
molar ratio TFE/FMVE in the fed monomeric mixture: 26.03;
composition of the gaseous mixture present in the reactor head (analyzed by gas chromatography) before the reaction start, expressed in percent by moles: TFE 82.5%, FMVE 16.0%, ethane 1.5%.

The nominal polymeric composition is the following: FMVE 6% by weight (3.7% by moles), TFE 94% by weight (96.3% by moles). The composition and some chemico-physical properties of the polymer are reported in Table 1.

The obtained granules are extruded to obtain a covered wire as described in Example 1.

The reached maximum rate and the spark failure number occurring for 14 km of manufactured cable are reported in Table 2; the mechanical properties of the insulating sheath before and after thermal aging for 7 days at 232° C. (UL 444 standard) are reported in Table 3.

Example 4

Preparation of a TFE/FMVE 95/5 Polymer and Subsequent Extrusion in Wire Line

The polymerization described in Example 1 is repeated except for the amount of the following components:
ethane: 0.44 absolute bar ($4.4 \times 10^4$ Pa);
FMVE: 4.1 absolute bar ($4.1 \times 10^5$ Pa);
molar ratio TFE/FMVE in the fed monomeric mixture: 19;
composition of the gaseous mixture present in the reactor head before the reaction start, expressed in percent by moles: TFE 73.3%, FMVE 25.5%, ethane 1.2%.

The nominal polymeric composition is the following: FMVE 8% by weight (5% by moles), TFE 92% by weight (95% by moles).

The composition and some chemico-physical properties of the polymer are reported in. Table 1.

The obtained granules are extruded to obtain a cable covered as described in Example 1.

The reached maximum rate and the spark failure number occurring for 14 km of manufactured cable are reported in Table 2.

The mechanical properties of the insulating sheath before and after thermal aging for 7 days at 232° C. (UL 444 standard) are reported in Table 3.

Example 5 (Comparative)

Preparation of a TFE/FMVE 98/2 Polymer and Subsequent Extrusion in Wire Line

The polymerization described in Example 1 is repeated except for the amount of the following components:
ethane: 0.64 absolute bar ($6.4 \times 10^4$ Pa);
FMVE: 1.52 absolute bar ($1.52 \times 10^5$ Pa);
molar ratio TFE/FMVE in the fed monomeric mixture: 49;

composition of the gaseous mixture present in the reactor head before the reaction start, expressed in percent by moles: TFE 89.3%, FMVE 9%, ethane 1.7%.

The nominal polymeric composition is the following: FMVE 3.3% by weight (2% by moles), TFE 96.7% by weight (98% by moles).

The composition and some chemico-physical properties of the polymer are reported in Table 1.

The obtained granules are extruded to obtain a cable covered as described in Example 1.

The reached maximum rate and the spark failure number occurring for 14 km of manufactured cable are reported in Table 2.

By using said polymer it has been observed that at rates higher than the maximum rate indicated in the Table of 100 m/min, the extrusion cone fracture takes place.

The mechanical properties of the insulating sheath before and after thermal aging for 7 days at 232° C. (UL 444 standard) are reported in Table 3.

Example 6 (Comparative)

Preparation of a Wire with Sheath Formed by a TFE/HFP/FEVE Terpolymer According to U.S. Pat. No. 5,703,185

Granules of a TFE/HFP/FEVE terpolymer having the composition, expressed in percent by moles, reported in Table 1, are extruded to obtain a covered cable as described in Example 1.

The composition and some chemico-physical properties of the polymer are reported in Table 1.

The reached maximum rate and the spark failure number occurring for 14 km of manufactured cable are reported in Table 2; the mechanical properties of the insulating sheath before and after thermal aging for 7 days at 232° C. (UL 444 standard) are reported in Table 3.

Example 7

Preparation of a TFE/FMVE 93.7/6.3 Polymer and Subsequent Extrusion in Wire Line The polymerization described in Example 1 is repeated except for the amounts of the following components:
ethane: 0.405 absolute bar ($4.05 \times 10^4$ Pa);
FMVE: 4.5 absolute bar ($4.5 \times 10^5$ Pa);
molar ratio TFE/FMVE in the fed monomeric mixture: 14.87;
composition of the gaseous mixture present in the reactor head before the reaction start, expressed in percent by moles: TFE 72.6%, FMVE 25.8%, ethane 1.6%.

The nominal polymeric composition is the following: FMVE 10.04% by weight (6.3% by moles), TFE 89.96% by weight (93.7% by moles).

The composition and some chemico-physical properties of the polymer are reported in Table 1.

The obtained granules are extruded to obtain a cable covered as described in Example 1.

The reached maximum rate and the spark failure number occurring for 14 km of manufactured cable are reported in Table 2.

The mechanical properties of the insulating sheath before and after thermal aging for 7 days at 232° C. (UL 444 standard) are reported in Table 3.

Comments on the Results of the Examples

The Tables show that by increasing the TFE amount in the copolymer, see Table 3, beyond the present invention limits, see the Example 5 (comparative) (TFE=98% by moles) the mechanical properties determined on cable (stress and elongation at break for Example 5 (comparative)) are lower than the corresponding minimum values required by the UL 444 standard. Besides, the speed reached in wire line is very low (Table 2) with a high incidence of spark failures.

Table 2 shows that the cable obtained from the TFE/FMVE/FPVE terpolymer is extruded at a lower wire speed with respect to the cable obtained with the copolymer according to the present invention.

TABLE 1

Composition and chemico-physical properties of the copolymers ot Examples 1–5

| Examples | Polymer composition | | T(II)melt | MFI |
|---|---|---|---|---|
| | Monomers | % by moles | (° C.) | (g/10') |
| 1 | TFE/FMVE | 96/4 | 286.5 | 22 |
| 2 comp. | TFE/FMVE/FPVE | 96.15/3.5/0.35 | 285 | 22 |
| 3 | TFE/FMVE | 96.3/3.7 | 290 | 22 |
| 4 | TFE/FMVE | 95.0/5.0 | 274 | 23 |
| 5 comp. | TFE/FMVE | 98/2 | 305 | 21 |
| 6 comp. | TFE/HFP/FEVE | 91.7/8/0.3 | — | — |
| 7 | TFE/FMVE | 93.7/6.3 | 264 | 21 |

TABLE 2

Wire speed and spark test (failures/14 km) of the polymers of the Examples used to cover AWG 24 cables, having a diameter of 0.81 mm

| Examples | Wire speed (m/min) | Spark test Spark failures/ 14 km |
|---|---|---|
| 1 | 900 | 2 |
| 2 comp. | 600 | 3 |
| 3 | 900 | 2 |
| 4 | 900 | 2 |
| 5 comp. | 100 | 2* |
| 6 comp. | 900 | 4 |
| 7 | 900 | 2 |

*frequent cracks of the extrusion cone

TABLE 3

Mechanical properties (stress and elongation at break) on wires with sheath formed with the copolymers of the Examples, before and after thermal aging at 232° C. for 7 days (UL 444). In the column wherein the stress at break values after aging are reported, the percentages with respect to the initial values are indicated between brackets.

| | Extruded wire | | Wire after aging | |
|---|---|---|---|---|
| Examples | Stress at break (MPa) | Elong. at break (%) | Stress at break (MPa) | Elong. at break (%) |
| 1 | 18.2 | 210 | 17.8 (98%) | 214 |
| 2 comp. | 18 | 200 | 17 (94%) | 200 |
| 3 | 17.2 | 260 | 14 (81%) | 240 |
| 4 | 20 | 220 | 17.6 (88%) | 200 |
| 5 comp. | 13.3* | 60** | — | — |

*value of stress at break lower than the minimum required by the UL 444 standard.
**value of elongation at break lower than the minimum (200%) required by the UL 444 standard.

The invention claimed is:

1. Melt processable copolymers at an extrusion rate higher than 800 m/minute, formed by TFE and FMVE, having Melt Flow Index (MFI) (ASTM D 1238) from 8 g/10 min to 50 g/10 min obtained by using in the polymerization step a chain transfer agent in an amount so to obtain the above MFI, having mechanical properties unchanged after thermal aging for 7 days at 232° C.,
  said copolymers having the following composition:
  FMVE in per cent by moles from 3.7% to 5.2%
  the percent TFE moles being the complement to 100% of the FMVE moles.

2. Copolymers according to claim 1 having the following property:
  the second melting temperature T(II) melt from 250° C. to 300° C.

3. Process for preparing sheaths for cables by extrusion of copolymers according to claim 1.

4. Process according to claim 3 wherein the cables are LAN cables.

5. Wires having sheaths formed by the polymers of claim 1.

6. Copolymers according to claim 2 wherein the second melting temperature T(II) is from 275° C.–289° C.

7. Copolymers according to claim 2 wherein the Melt Flow Index (ASTM D 1238) is from 20 g/10 min to 40 g/10 min.

* * * * *